Figure 1:
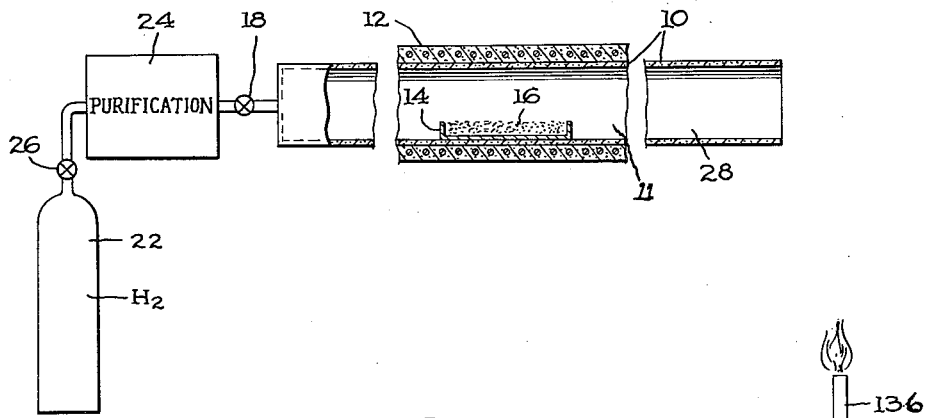

Feb. 27, 1962 E. WAINER ETAL 3,023,115
REFRACTORY MATERIAL
Filed Feb. 3, 1960

INVENTORS
EUGENE WAINER
ANDREW L. CUNNINGHAM
BY *Lawrence J. Field*
ATTORNEY

United States Patent Office 3,023,115
Patented Feb. 27, 1962

3,023,115
REFRACTORY MATERIAL
Eugene Wainer, Cleveland Heights, and Andrew L. Cunningham, Cleveland, Ohio, assignors to Horizons Incorporated, Cleveland, Ohio, a corporation of New Jersey
Filed Feb. 3, 1960, Ser. No. 6,492
6 Claims. (Cl. 106—65)

This invention relates to fibers consisting principally of alumina and containing silicon dioxide in small but significant proportions, and to methods of making such fibers. More particularly, it relates to novel products in the form of translucent fibers of alumina complexed with relatively small amounts of silica and to methods of producing such products. The novel fibers produced in accordance with this invention are fibers having substantially uniform diameters between about 0.01 and 0.03 millimeter and having tensile strengths in excess of one millon pounds per square inch.

In a copending application, Serial No. 829,219, filed July 24, 1959, we have described a method for producing sapphire fibers whose chemistry and structure is substantially equivalent to alpha aluminum oxide. In brief, this application describes the formation of a volatile suboxide of aluminum by passing hydrogen containing significant amounts of water vapor over molten aluminum at an elevated temperature and thereafter moving said suboxide of aluminum in vapor form in the presence of significant amounts of aluminum metal into physical contact with a surface having a lower heat of formation than aluminum oxide, such surface being comprised of silica or compounds containing silicia. Under such conditions, sapphire fibers are produced at the site of contact of the silica containing substrate and at some distance away from the original source of the aluminum suboxide.

While this technique is effective in producing fibers with a desirable range of properties, the yields from original starting raw material are low, not exceeding 10% on the basis of the available raw materials. In addition, it did not appear possible to make the process reasonably continuous, apparently due to the covering up or blocking of the sites of nucleation and formation on the silica containing surface.

It is one object of this invention to define methods whereby the yields are sharply increased over those available from following the teachings of Serial No. 829,219. It is a further object of this invention to provide methods where under controlled conditions substantially all of the starting raw materials may be utilized to produce fibers. It is a further object of this invention to make available or define methods whereby the metering of the alumina source and the catalytic source may be handled separately and separately controlled. Still another object of this invention is to define a technique for continuous formation of aluminum oxide type of fibers involving recirculation of ingredients. Finally, it is a major object of this invention to define a new composition of matter made as a result of utilizing such processes comprising a fiber composed chiefly of aluminum oxide with minor but significant amounts of silicon dioxide in its composition.

Briefly in one aspect of our invention we have found that if a gaseous suboxide of aluminum, preferably in the presence of the vapors of aluminum metal is caused to mix with a gaseous oxygen-containing compound of silicon, that fibers containing between 95 and 99% aluminum oxide and between 1 and 5% silicon dioxide are produced rapidly and in high yields. We have further found that a by-product of such a reaction is silicon metal which can be further treated in a cyclic process to reconstitute the desired gaseous oxygen-containing compound of silicon for further use in preparing more fibers based on alumina.

Specifically, we have determined that this novel fibrous product can be produced by mixing (in a suitable environment and at suitable temperatures) aluminum metal with either silica or with a compound containing silica in finely divided form; or the reactive gaseous compounds of aluminum and silicon respectively can be prepared separately and subsequently brought into contact with one another, such chemical systems producing fibers consisting chiefly of alumina with very minor amounts of silica, through the medium of passing hydrogen over the respective zones of the reaction at an elevated temperature, the hydrogen containing minute amounts of water vapor.

As a variation of these procedures, the equipment making it possible to produce such fibers can be designed such that the silicon metal and its important gaseous oxide can be recycled through the zone of the reaction, so that its effectiveness of use approaches a quantitative and theoretical result.

Figure 2:
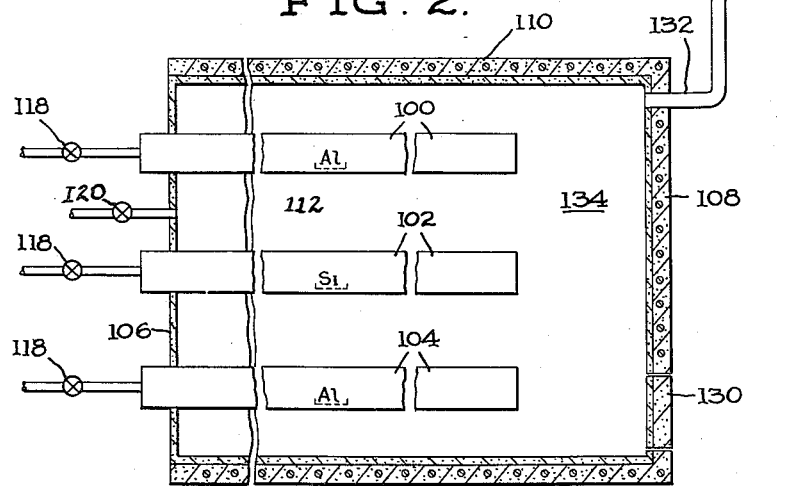

In the accompanying drawings:
FIGURE 1 shows one suitable apparatus for practicing the invention; and FIGURE 2 is a modification thereof.

When molten aluminum is brought into contact with trace amounts of oxygen, either free or combined, at temperatures of 1200° C. and above, either of two gaseous oxides may form: AlO or $Al_2O$. Regardless of which oxide forms, on cooling of such a gaseous oxide, the oxide disproportionates to produce alpha alumina plus aluminum metal. By providing a suitable combination of environments, techniques and procedures, as hereinafter disclosed, whiskers of the desired properties have been found to form which are comprised of a combination consisting principally of aluminum oxide and containing much smaller amounts of silicon dioxide.

For the growth of the alumina-silica type fibers with the desired properties, it is necessary that the temperature of the aluminum melt be at least 1200° C. and preferably between 1370° C. and 1400° C. for optimum growth. This has been found to be necessary whether the melt is aluminum metal, aluminum alloy, or aluminum complexed with silicon or one or more compounds of silicon.

While we do not wish to be bound by any specific theory, it appears that the required oxygen is obtained either from a minute amount of oxygen-containing material in the hydrogen carrier gas, usualy water vapor, or from the oxygen in the siliceous compounds utilized with the aluminum metal or from a combination of both. In the presence of silicon compounds, the chemical mechanism of the desirable type of fiber growth appears to be the following: Means are provided for producing a gaseous suboxide of aluminum at an elevated temperature in a controlled atmosphere. Simultaneously, either in the same vessel containing the starting raw materials for producing the gaseous suboxide of aluminum or in a separate vessel, means are provided for producing the gaseous monoxide of silicon, namely, SiO. When these two gaseous components come in contact with each other, fiber formation begins immediately and proceeds very much more rapidly and in higher yields than when the gaseous aluminum suboxide is brought in contact with a solid form of silica. From this, it appears that rather than the disproportionation of the aluminum suboxide being the predominating reaction, the reaction which takes place between the gaseous suboxide of aluminum and the gaseous monoxide of silicon produces mainly fibers of aluminum oxide containing some silica and a by-product consisting of elemental silicon. Thus the need for making available a solid nucleating surface is eliminated and also there is no requirement for reduction of temperature to cause the formation of the aluminum oxide. The elemental silicon may be recycled as described below to serve as a further source of chemical catalyst. When aluminum oxide fibers are formed in the manner described through the use of silicon or silicon-containing compounds, the chemical composition of the fiber contains significant amounts of silicon dioxide in the fiber itself to the extent of about 95 to 99% aluminum oxide and about 1 to 5 silicon dioxide.

One critical requirement of our process then resides in carrying out the reaction between a suboxide of aluminum and silicon monoxide in the vapor phase in the presence of a controlled atmosphere which leads to the formation of the novel fiber previously described.

To facilitate a fuller understanding of the invention, several modes of practicing the invention are described below. These are to be considered illustrative of preferred practices rather than construed as limitative of the invention.

A charge is prepared by mixing suitable proportions of powdered silica or a powdered refractory compound containing silica with aluminum metal in powder or chunk form. The charge is placed in an aluminum oxide boat which is in turn inserted in an alumina tube furnace provided with suitable conventional means to control the furnace atmosphere. The charge is heated to a temperature of 1380° C. while maintaining a hydrogen atmosphere in the furnace. Hydrogen is passed over the charge at the rate of about one liter per minute. The hydrogen utilized may be bone dry or may contain up to 3 to 5 parts per million of water vapor without deleterious effect. When the process is conducted in this manner, fibers are formed on the end of the boat containing the charge away from the hydrogen source and fibers are also formed in the alumina tube some distance beyond the boat and further away from the hydrogen source, this distance being in some cases as much as several inches.

The silica-containing materials which may be used are preferably powdered to minus 200 mesh (Tyler Standard) size. Suitable materials include ground quartz, aluminum silicates, zirconium silicates, aluminum-titanium silicates, and the like. We have found that silica in pure form and in the form of one of its refractory compounds appear to be equally effective.

The aluminum metal may be pure metal or it may be complexed in accordance with the teachings of Serial No. 829,219 with up to about 20 mole percent of such metals as titanium, zirconium, and the like.

In order to obtain significant fiber formation and at reasonable rates of production, the reactants must be provided in such relative proportions that the aluminum present is in substantial excess of two moles of aluminum for each three moles of silica or silica compound. It has been found that significant rates of formation of suitable fiber begins at a ratio of three moles of aluminum to three moles of silica, and is significantly enhanced when the amount of aluminum is increased to four moles of aluminum per three moles of silica, and the aluminum excess may be increased to at least ten moles of aluminum per mole of silica, and even higher, to provide additional advantages in the practice of the process. In other words, the minimum effective quantities for a starting mixture of the type described will comprise approximately one part by weight of aluminum to two parts by weight of silica and may extend to at least ten parts by weight of aluminum per part of silica.

The median rate of growth appears to be a function of the exposed surface of the starting melt. In those cases where gaseous aluminum suboxide vapor is brought into contact with a solid silica surface at a point separate from the point of origin of a gaseous aluminum oxide as described in Serial No. 829,219, the median rate of growth from one square inch of starting surface is approximately 30 milligrams of fiber per hour of treatment with hydrogen under the conditions described in that application. In the procedure above described in the present application where the silica-containing materials are mixed directly with the aluminum metal which may or may not be further complexed with minor amounts of titanium and zirconium and the like, the median rate of growth is in the neighborhood of 170 to 200 milligrams per hour of treatment per square inch of starting raw material surface.

The following specific examples of the method are intended to further illustrate the invention and are not to be construed as limitive.

*Example 1*

The apparatus shown in FIGURE 1 was employed in this and in the three examples which follow. An alumina tube two inches in diameter, thirty eight inches in length with a 3/16 inch wall thickness is used as the reaction container 10. The middle portion 11 of this tube is enclosed in an electric furnace 12 capable of reaching temperatures of about 1500° C. Two grams of a charge 16 mixed in the ratio of 4.1 moles of 40 mesh aluminum powder and 3 moles of 200 mesh ground quartz are placed in an alumina boat 14 and spread over an area roughly 0.5 square inch in area. The alumina boat containing the charge is placed in the midsection 11 of the eventual hot zone of the alumina tube. Purified hydrogen is admitted to tube 10 through inlet 18 and then passed over the charge. The hydrogen employed was passed from a source of supply 22 controlled by a valve 26 into and through a purification train 24 consisting of a Deoxo purifier, bubbler, dust trap, cold trap, $P_2O_5$ tower, $MgClO_4$ tower, and a second $P_2O_5$ tower. The dewpoint of the hydrogen introduced into the furnace from such a purification train was less than −90° F. Hydrogen gas was utilized at the rate of about one liter per minute. The charge was heated to 1380° C. and after reaching this temperature, the treatment at time, temperature, and atmosphere was continued for one hour, the products of the reaction being suitably voided to the atmosphere. Seventy-three milligrams of alumina fibers of small diameter were recovered from the exit portion 28 of the tube and boat after the reaction was allowed to cool down to room temperature in the controlled atmosphere. The actual yield was somewhat greater than this, but the amounts indicated represented the fibers which could be readily retrieved. Chemical analysis of these fibers indicated that they contained 97.6% $Al_2O_3$ and approximately 2.4% $SiO_2$. The diameters of the fibers averaged between 0.5 and 1.5 microns, and the tensile strengths by direct measurement were in excess of 2,000,000 pounds per square inch. The length of the fibers produced averaged about 0.5 inch, though occasional specimens could be seen in the product extending up to 3 inches.

*Example 2*

Utilizing the same physical conditions as in Example 1, except that the initial reaction mixture used consisted of 95 mole percent aluminum metal and 5 mole percent silicon dioxide, again spread over one-half square inch of area in the reaction zone, the procedure described in Example 1 was repeated. The rate of production of fibers under these circumstances amounted to 82 milligrams per hour and analysis indicated that the resulting fiber composition was approximately 99% (by weight) aluminum oxide and 1% silicon dioxide.

*Example 3*

The procedure of Example 1 was repeated except that the charge consisted of about two grams of a mixture of 90 mole percent metallic aluminum and 10 mole percent −200 mesh mullite spread over one-half square inch of area. The procedure described was otherwise the same and as a result 70 milligrams of fiber were recovered in one hour, in which the fiber diameter in lengths varying from 0.5 up to 2 inches was of the order of 0.5 to 1.0 micron. Strengths were in excess of 2,000,000 pounds per square inch.

*Example 4*

Two grams of a mixture consisting of 10 mole percent silicon dioxide, 10 mole percent titanium metal, and 80 mole percent aluminum metal all in powder form was spread over 0.5 inch of reaction area in the same apparatus as in Example 1. Utilizing the same conditions as those previously described, 92 milligrams of fiber were produced in one hour. These exhibited an analysis of 98.6% by weight aluminum oxide and approximately 1.4% silicon dioxide, there being no detectable titanium content.

Instead of producing the mixture of a gaseous suboxide of aluminum and a gaseous oxygen-containing compound of silicon in the manner described in Examples 1–4, at least two other alternative methods have been found useful.

One such method which has been described in our application Serial No. 829,219 consists of heating a mixture of aluminum with up to 25 mole percent of silicon in a suitable environment to a temperature sufficient to melt the charge.

Another method has now been found which has a significantly improved rate of production of fibers as compared with the method disclosed in the earlier filed application. In this method the aluminum metal and elemental silicon are disposed separately in separate boats which are preferably located in a single heating chamber.

In FIGURE 2 there is shown in schematic form one apparatus for practicing this variation of the method of the following example.

The apparatus consists of a plurality of aluminum oxide boats 100, 102, 104 mounted in and supported on an optical wall 106 through which they extend. Wall 106 and a rear wall 108 together with a cylinder 110 form a heating chamber 112 formed of silicon-free material and preferably of alumina. The chamber is capable of being heated to 2500° F. Tubes 100, 102 and 104 are all provided with valved inlets 118 connected to a source of purified, moist hydrogen in the same manner as in FIGURE 1. The side wall 106 also has a valved inlet 120 adapted to be connected to purified nitrogen or helium or other inert gas. Wall 108 has a door 130 through which fibers may be recovered and a vent 132 connected to a stack 136 through which process gases are vented. In operation the excess hydrogen is burned at vent 132 or at the exit end of stack 136.

Example 5

The apparatus of FIGURE 2 was charged with metallic aluminum and elemental silicon as shown and heated sufficiently for the separate formation of silicon monoxide and the gaseous suboxide of aluminum, each of which passed out the open end of tubes 100, 102 and 104 into the central reaction zone in the apparatus. These two gases were brought into contact with each other in the hot zone 134 where the formation of aluminum oxide fibers containing minor amounts of silica takes place immediately. A by-product of the reaction is silicon metal. As the result of the presence of a minute amount of water vapor in the carrying hydrogen, the silicon metal obtained as the by-product is again transformed back into silicon monoxide. It is recirculated into the zone of the reaction where aluminum suboxide is being introduced. There it appears to assist in the formation of further quantities of aluminum oxide fiber at an accelerated rate. On this basis, the silicon metal initially used in the reaction acts basically as a catalyst. Not only are high rates of production available by this technique which provides for the complete utilization of all the aluminum starting raw material, but control of fiber properties is available by variation in the handling of the silicon monoxide vapor.

The aluminum oxide gas was produced in one arm 100 of the apparatus in a silica-free aluminum oxide tube by passing hydrogen containing traces of water vapor over molten aluminum at a temperature between 1370° and 1400° C. This aluminum suboxide gas was then passed unchanged into a central reaction zone also heated between a temperature of 1370° and 1400° C. In a separate arm 102 leading into the reaction zone, silicon metal was heated in the presence of hydrogen containing traces of water vapor. The resulting silicon monoxide was also led into the hot reaction zone and aluminum fiber formation was initiated. Bypasses are added to the back portion of the reaction zone, these being maintained at full reaction temperature. Through such bypasses silicon monoxide is again reconstituted from the metallic silicon available from the by-product of the reaction and reacts with fresh aluminum suboxide vapor coming from the original chamber to make the operation completely cyclic. The equipment contains other auxiliary devices (not shown) for adding hydrogen, venting the excess of hydrogen, adding aluminum metal about as rapidly as it is used up to produce fibers, and means for removing the fibers from the hot reaction zone without shutting the reaction down.

Under the conditions described, rates of production have been achieved varying between 300 and 400 milligrams of fibers per hour per square inch of aluminum metal starting surface. Except for the initial oxide raw material content of aluminum metal utilized, all of the aluminum metal is eventually transformed into fiber. The silicon needs occasional replenishment in accordance with the amount of silicon dioxide which is permanently removed from the reaction as part of the composition of the fiber. Generally, a minimum of about one part of silicon metal is required for the catalyzing of 20 to 25 parts of aluminum metal and one part of aluminum metal will usually produce approximately two parts of aluminum oxide fiber.

Substantially all of the oxygen required for the purpose is derived from the moist hydrogen utilized as the carrier gas, and it is preferable that the dewpoint of the hydrogen used in order to match the optimum growth rate of the fiber will vary between about −30° C. and −50° C.

In a variant of this method, dry hydrogen may be used if a mixture of silicon and silicon dioxide is used in place of the silicon used with moist hydrogen.

Having now described our invention in accordance with the patent statutes, we claim:

1. A method of forming refractory inorganic fibers which consists in reacting a gaseous suboxide of aluminum with silicon monoxide vapor in an atmosphere of hydrogen maintained in a heated reaction zone, wherein the relative proportions of aluminum suboxide and silicon monoxide are such that the aluminum suboxide is present in substantial excess of two moles for each three moles of silicon monoxide and recovering the silica-containing alumina-base fibers resulting from said reaction.

2. A method of forming alumina fibers which consists in reacting a gaseous suboxide of aluminum with silicon monoxide vapors in hydrogen at about 1370° C. to 1500° C., wherein the relative proportions of aluminum suboxide and silicon monoxide are such that the aluminum suboxide is present in substantial excess of two moles for each three moles of silicon monoxide and recovering the silica-containing alumina-base fibers resulting from said reaction.

3. A method of forming fibrous alumina which consists in reacting a gaseous suboxide of aluminum with gaseous silicon monoxide in a heated reaction zone in the presence of molten aluminum, maintained at a temperature between about 1200° C. and 1500° C. and under a hydrogen atmosphere and wherein the relative proportions of aluminum suboxide and silicon monoxide are such that the aluminum monoxide is present in substantial excess of two moles for each three moles of silicon monoxide; thereby producing alumina fibers and small amounts of silica and elemental silicon, and recovering the silica-containing alumina fibers resulting from said reaction.

4. A method of forming fibrous alumina which consists in reacting a gaseous suboxide of aluminum with gaseous silicon monoxide in a heated reaction zone in the presence of molten aluminum, maintained at a temperature between about 1200° C. and 1500° C. and under a hydrogen atmosphere and wherein the relative proportions of aluminum suboxide and silicon monoxide are such that the aluminum monoxide is present in substantial excess of two moles for each three moles of silicon monoxide; thereby producing alumina fibers and small amounts of silicon and silica, recovering the silica-containing alumina fibers resulting from said reaction and recycling the silicon to replenish the supply of gaseous silicon monoxide for the reaction.

5. A method of forming fibrous alumina which consists in melting aluminum admixed with a silica-containing material, maintaining the melt in a hydrogen atmosphere and at a temperature between about 1200° C. and 1500° C., the relative proportions of aluminum and silica-containing material being such that at least about two moles of aluminum compound are present in the vapor evolved from the melt for each three moles of silicon compound evolved and reacting the gaseous suboxide of aluminum and gaseous silicon monoxide evolved from the melt, and recovering the silica-containing alumina fibers resulting from said reaction.

6. A composition of matter consisting essentially of between about 95% and 99% by weight of alumina and between about 1% and 5% by weight of silica, said composition being in the form of discrete fibers.

References Cited in the file of this patent
UNITED STATES PATENTS
2,899,323    Venable _____ Aug. 11, 1959